(12) United States Patent
Starkey et al.

(10) Patent No.: US 10,112,352 B2
(45) Date of Patent: Oct. 30, 2018

(54) PRESS MOULDING METHOD

(71) Applicant: Gurit (UK) Ltd., Newport, Isle of Wight (GB)

(72) Inventors: Martin James Starkey, Brighstone Isle of Wight (GB); Peter Jennings, Newport (GB); Gregory Aratoon, Ventnor (GB)

(73) Assignee: Gurit (UK) Ltd., Newport, Isle of Wight (GB)

( * ) Notice: Subject to any disclaimer, the term of this patent is extended or adjusted under 35 U.S.C. 154(b) by 389 days.

(21) Appl. No.: 14/404,658

(22) PCT Filed: May 30, 2013

(86) PCT No.: PCT/EP2013/061188
§ 371 (c)(1),
(2) Date: Dec. 1, 2014

(87) PCT Pub. No.: WO2013/178748
PCT Pub. Date: Dec. 5, 2013

(65) Prior Publication Data
US 2015/0336303 A1    Nov. 26, 2015

(30) Foreign Application Priority Data

May 30, 2012   (GB) .................................. 1209618.6

(51) Int. Cl.
*B29C 70/46* (2006.01)
*B29C 43/18* (2006.01)
(Continued)

(52) U.S. Cl.
CPC ............ *B29C 70/465* (2013.01); *B29C 43/00* (2013.01); *B29C 43/18* (2013.01); *B29C 43/203* (2013.01);
(Continued)

(58) Field of Classification Search
CPC .......................... B29C 70/546; B29C 70/547
See application file for complete search history.

(56) References Cited

U.S. PATENT DOCUMENTS 2,415,504 A * 2/1947 MacDonald ........ B29C 43/3607
100/211
3,055,058 A * 9/1962 Van Hartesveldt .........................
B29C 43/3607
156/286
(Continued)

FOREIGN PATENT DOCUMENTS

WO     99/38683 A1    8/1999

OTHER PUBLICATIONS

Gojny, F.H., et al, Carbon nanotube-reinforced epoxy-composites: enhanced stiffness and fracture toughness at low nanotube content, Composites Science and Technology, vol. 64 (2004) pp. 2363-2371.*

(Continued)

*Primary Examiner* — Matthew J Daniels
(74) *Attorney, Agent, or Firm* — Polsinelli., PC

(57) ABSTRACT

A method of press molding a molding material to form a molded part of fiber-reinforced resin matrix composite material, the method comprising the steps of:
i. locating a molding material in a mold tool, the molding material containing fibers, resin and a syntactic layer comprising a polymer matrix and a plurality of hollow bodies distributed within the polymer matrix;
ii. permitting the molding material to drape at least partly under the action of gravity within the mold so as to configure at least part of the draped molding material in a partly molded shape;
iii. fully closing the mold tool to define a closed mold cavity containing the molding material;
(Continued)

iv. applying pressure to the mold cavity to cause resin to flow and impregnate the fibers and to configure the molding material in a fully molded shape; and
v. substantially fully curing the resin to form a molded part from the molding material.

23 Claims, 1 Drawing Sheet

(51) Int. Cl.
| | |
|---|---|
| *B29C 70/34* | (2006.01) |
| *B29C 70/66* | (2006.01) |
| *B29C 70/08* | (2006.01) |
| *B29C 43/00* | (2006.01) |
| *B29C 70/44* | (2006.01) |
| *B29C 43/20* | (2006.01) |
| *B29C 43/56* | (2006.01) |
| *B29K 63/00* | (2006.01) |
| *B29K 105/08* | (2006.01) |
| *B29K 307/04* | (2006.01) |
| *B29K 309/08* | (2006.01) |
| *B29L 9/00* | (2006.01) |
| *B29L 31/30* | (2006.01) |

(52) U.S. Cl.
CPC ......... *B29C 70/086* (2013.01); *B29C 70/345* (2013.01); *B29C 70/443* (2013.01); *B29C 70/46* (2013.01); *B29C 70/467* (2013.01); *B29C 70/66* (2013.01); *B29C 43/20* (2013.01); *B29C 2043/563* (2013.01); *B29K 2063/00* (2013.01); *B29K 2105/0872* (2013.01); *B29K 2105/0881* (2013.01); *B29K 2307/04* (2013.01); *B29K 2309/08* (2013.01); *B29L 2009/00* (2013.01); *B29L 2031/3005* (2013.01)

(56) References Cited

U.S. PATENT DOCUMENTS

| | | | | |
|---|---|---|---|---|
| 3,957,943 | A * | 5/1976 | Ogura | B29C 43/20 |
| | | | | 264/245 |
| 4,025,686 | A * | 5/1977 | Zion | B29C 70/025 |
| | | | | 264/46.5 |
| 4,118,814 | A * | 10/1978 | Holtom | B29C 66/124 |
| | | | | 114/357 |
| 4,250,136 | A | 2/1981 | Rex | |
| 4,559,398 | A * | 12/1985 | Tesch | C07D 231/12 |
| | | | | 525/504 |
| H559 | H * | 12/1988 | Brown | 264/102 |
| 5,731,015 | A * | 3/1998 | Bartilucci | B29C 35/02 |
| | | | | 156/382 |
| 6,139,942 | A * | 10/2000 | Hartness | B29B 15/105 |
| | | | | 428/297.4 |
| 6,627,018 | B1 * | 9/2003 | O'Neill | B29C 44/1209 |
| | | | | 156/245 |
| 2004/0131840 | A1 * | 7/2004 | Ferguson | C08J 9/32 |
| | | | | 428/317.9 |
| 2008/0280120 | A1 * | 11/2008 | Fechner | E04B 1/803 |
| | | | | 428/304.4 |
| 2012/0038081 | A1 * | 2/2012 | Kendall | B29C 43/18 |
| | | | | 264/257 |

OTHER PUBLICATIONS

Marsh, George, Carbon composite car body panels gain traction with Gurit Automotive, Reinforced Plastics, Sep./Oct. 2011, pp. 24-27.*
International Preliminary Report on Patentability dated Dec. 2, 2014 from International Application No. PCT/EP2013/061188.
Office Action dated Apr. 20, 2018 in corresponding European Patent Application No. 13725981.8.

* cited by examiner

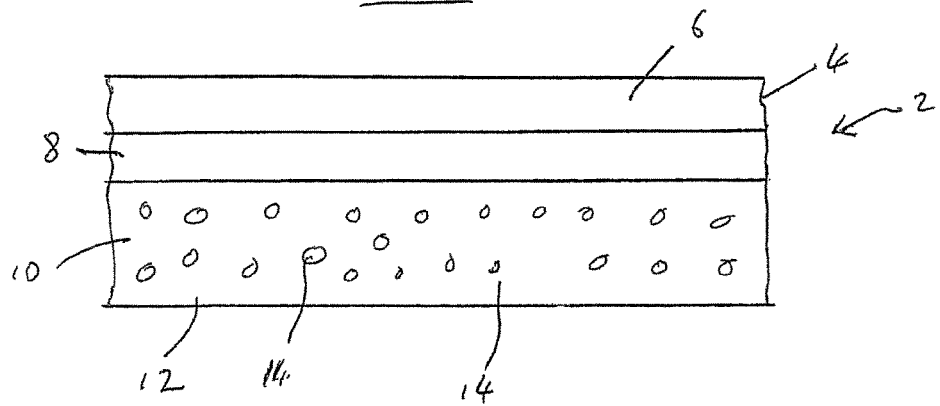
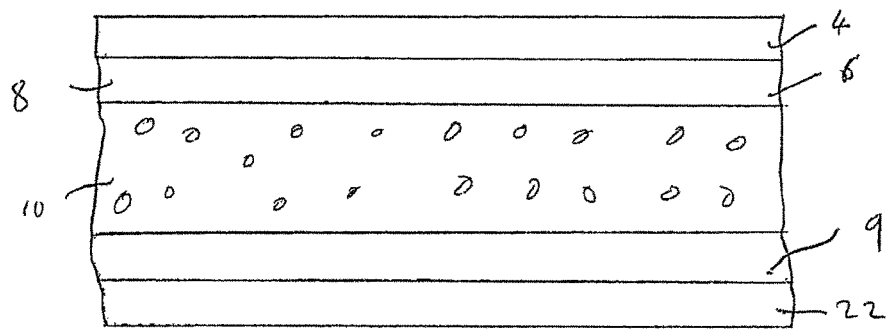
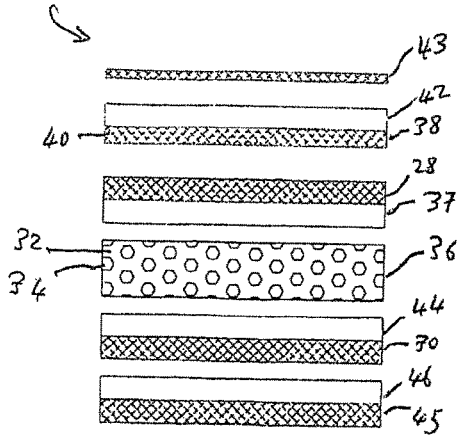
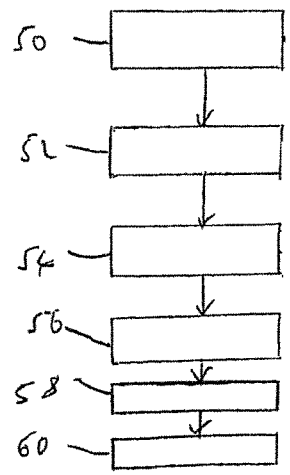

PRESS MOULDING METHOD

FIELD OF THE INVENTION

The present invention relates to a method of press moulding materials including polymer resins to form a moulded part. In particular, the present invention relates to such a method which is for manufacturing moulded parts composed of fibre reinforced resin matrix composite materials, such as, for example, panels, more particularly automotive body panels.

BACKGROUND

It is known to produce moulded parts for various applications, and having various shapes and configurations, by moulding materials including polymer resins, in particular for the manufacture of moulded parts composed of fibre reinforced resin matrix composite materials. Such composite materials are typically manufactured from moulding materials which may typically comprise, for example, (a) the combination of dry fibres and liquid resin, (b) prepregs and/or (c) sheet moulding compounds (SMC). Other materials may also be present, such as sandwich core materials and surfacing layers for forming a desired surface finish on the moulded part.

Many products are moulded by a manual process of laying-up the moulding material into a one sided mould, which moulds a single side of the resultant moulded article. Other products require a two-sided moulding process. In order to provide high manufacturing tolerance to the two-sided moulded part, it is sometimes required to use a press-moulding process in which the moulding material is moulded in a closed mould under elevated pressure.

The tooling is rigid, and accordingly a hydraulic pressure within the resin material of the moulding material is needed to achieve full impregnation of the fibres by the resin and cause resin flow to fill the geometrical details within the mould cavity, particularly at the peripheral edges of the mould cavity. Hydraulic pressure in the resin is generated by the press closing on the preform. Ideally the press should mould a net shaped part requiring no or limited subsequent trimming, machining or rework operations.

It is known to use syntactic material in prepregs. For example, the Applicant incorporates a syntactic layer, incorporating glass microspheres, into a moulding material available in commerce under the trade name Sprint CBS. The glass microspheres lower the density and increase the specific flexural modulus of the resultant moulded product. SMC material is heavy and does not yield parts with a good surface finish.

Prepreg stacks are typically made from assembling stacks of unidirectional prepreg to form a multiple angle ply laminate. This is difficult to conform to the mould geometry and high pressure is needed to press these materials.

It is accordingly an aim of this invention to provide a method of press moulding which at least partially overcome at least some of these significant disadvantages of the known press moulding materials and methods currently used to manufacture moulded parts of fibre reinforced resin matrix composite material, in particular which manufacture such parts using prepregs.

SUMMARY OF THE INVENTION

The present invention provides a method of press moulding a moulding material to form a moulded part of fibre-reinforced resin matrix composite material, the method comprising the steps of:

i. locating a moulding material in a mould tool, the moulding material containing fibres, resin and a syntactic layer comprising a polymer matrix and a plurality of hollow bodies distributed within the polymer matrix;

ii. permitting the moulding material to drape at least partly under the action of gravity within the mould so as to configure at least part of the draped moulding material in a partly moulded shape;

iii. fully closing the mould tool to define a closed mould cavity containing the moulding material;

iv. applying pressure to the mould cavity to cause resin to flow and impregnate the fibres and to configure the moulding material in a fully moulded shape; and v. substantially fully curing the resin to form a moulded part from the moulding material.

In this specification, the term "substantially fully cured resin" means that the residual enthalpy of the cured resin is less than 15% of the initial heat of polymerisation, as measured by differential scanning calorimetry (DSC), of the uncured resin in the moulding material.

In some particularly preferred embodiments, the moulding material and the moulded part are panel shaped, optionally the moulded part being an automotive body panel.

Preferably, the moulding material comprises a multilayer laminate and the syntactic layer is a core layer between first and second fibre layers.

In some embodiments, the fibres include a layer of dry fibres adjacent to the syntactic layer. Optionally, the fibres include a pair of layers of dry fibres adjacent to and on opposite sides of the syntactic layer which forms a core layer between the dry fibre layers. Optionally, the resin includes at least one layer of resin adjacent to a respective dry fibre layer.

In other embodiments, the fibres include at least one prepreg layer containing the curable resin.

In any of the embodiments, the resin preferably comprises a thermosetting resin, optionally an epoxy resin.

Preferably, at least some of the fibres comprise carbon fibres and a layer of carbon fibres is adjacent to a respective layer of resin. In some preferred embodiments, the moulding material comprises a multilayer laminate and the syntactic layer is a core layer between a first carbon fibre layer and a second glass fibre layer, each fibre layer being adjacent to a layer of resin. Optionally, the moulding material may further comprise a layer of a surfacing resin on the front face of the moulding material which is on the same side of the syntactic layer as the first carbon fibre layer.

Optionally, in step ii the moulding material drapes by bending about a neutral axis substantially centrally located with respect to the thickness of the moulding material, the neutral axis being located within the syntactic layer. Optionally, in step ii the moulding material is heated to cause the viscosity of the resin initially to decrease as a result of an increase in resin temperature and then to increase as a result of initiation of curing prior to step iii.

Optionally, in step ii a lower surface of the moulding material is draped onto at least a part of a lower moulding surface of the mould tool. Optionally, steps ii and iv are carried out at elevated temperature.

Optionally, the mould tool comprises a lower part and an upper part. The method may further comprise the step, between steps i and iii, of partially closing the mould tool by bringing the upper and lower parts into engagement with the moulding material. Optionally, in the partially closed configuration the upper part applies an additional downward force to the moulding material to enhance draping of the moulding material. Optionally, at least the upper part is heated to an elevated temperature, and from step i until at least the commencement of step iii the lower part is at a lower temperature than the upper part. Optionally, the temperature of the lower part is controlled so as to delay the onset of gelation of the resin until after step iii. Optionally, after closing step iii heat flows downwardly from the upper part into the resin, to assist curing of the resin, and towards the lower part. Optionally, the resin cures exothermically. Optionally, heat from the resin is sunk into the lower part which increases in temperature after closing step iii.

Optionally, a reduced pressure is applied to the mould during step ii to increase the drape of the moulding material.

Optionally, in step iv the applied pressure compresses the syntactic layer; and after step v the cured resin in the moulded part has a tensile strength sufficient to retain the syntactic layer in compression within the moulded part.

Optionally, the syntactic layer comprises hollow bodies which are substantially incompressible at a compressive moulding pressure applied to the moulding material of from 0.1 to 2 MPa. The hollow bodies may comprise substantially rigid microspheres having a crush strength of greater than 10 MPa, optionally composed of glass. The hollow bodies may have an average (d=0.5) diameter of from 5 to 120 microns, the width corresponding to a diameter when the hollow bodies are spherical.

Typically, the syntactic layer has a density of from 400 to 1000 kg/m$^3$. Typically, the syntactic layer has a volume which is from 30 to 85% of the volume of the resin in the moulding material.

Typically, the tensile strength of the cured resin is at least 40 MPa, optionally from 50 to 100 MPa, further optionally from 70 to 100 MPa. Typically, the Young's modulus of the cured resin is from greater than 2 GPa to 4 GPa, optionally from 3 to 4 GPa.

Accordingly, the present invention provides a method which is particularly suitable for manufacturing, from moulding materials containing fibres, resin and a syntactic layer, parts composed of fibre reinforced resin matrix composite materials, such as, for example, panels, more particularly automotive body panels which are fully impregnated and require no or limited subsequent trimming, machining or rework operations.

The present invention is at least partially predicated on the surprising finding by the present inventors have by allowing the moulding material, containing fibres, resin and a syntactic layer, to drape under low load, optionally when the mould is partially closed, and allowing some resin flow, fibre wetting and the resin viscosity to fall then rise prior to closing the mould, a slow drape can be achieved which can avoid the resin pinning and/or bridging fibres. This in turn reduces fibre breakage and defects in fibre layering and orientation. In contrast, if, as in a known press moulding process, the material is caused under elevated pressure to drape rapidly during a one-step press moulding process, the fast drape can cause fibre pinning and bridging, with consequential structural defects in the resultant composite material.

In addition, it has been found that by allowing the resin viscosity to rise during the initial draping step, this can reduce, and assist control of, resin flash at the mould edges during the later press moulding step and can retain the fibre layers in the required Z positions relative to the through thickness of the laminate. The increased resin viscosity at the outset of the press moulding step, resulting from the resin viscosity increase during the preliminary drape, therefore improves the moulding process and structural properties of the product.

The increased resin viscosity resulting from the viscosity increase during the drape step further allows a higher moulding pressure during the press moulding step, which in turn improves the surface properties, particularly at the "A-surface" where the surfacing layer is provided as the front face of the moulding material and the moulded part.

When dry fibres in the moulding material are located adjacent to the syntactic layer, in some embodiments, this can provide a low friction shear plane which readily permits the moulding material to drape at low load and without causing stress increases within the draped material.

By providing that the drape occurs about a neutral axis within the syntactic layer, as in some embodiments, this can provide that the drape can easily occur under low load, effectively under the force of gravity alone, or optionally with an additional downward force from the weight of the upper mould part, because the higher tensile strength fibres are located away from the neutral axis and are thus more easily bent under a lower load.

The press moulding method of the invention may be employed for the press moulding of prepreg, multi-laminar, preform and SMC moulding materials, which contain fibres, resin and a syntactic layer and may be used in a variety of applications, including but not limited to the press moulding of automotive body parts.

The press moulding method of the invention may be employed to produce high volume, lightweight, low cost automotive body panels composed of composite material, and such production may incur minimal labour costs as a result of reducing or avoiding post-moulding finishing costs since the resin flash is minimised or eliminated and the part is accurately moulded.

The resin composition may be selected to have a high degree of cross-linking, so as to have a high glass transition temperature Tg, with the result that the moulded part is able to be conveyed along a high temperature paint line without distortion or surface damage to maintain what is categorised for automotive body panels by those skilled in the art as a "class A" surface finish.

BRIEF DESCRIPTION OF THE DRAWINGS

Embodiments of the present invention will now be described by way of example only, with reference to the accompanying drawings, in which:

FIG. 1 illustrates a cross section through a moulding material for use in a press moulding method in accordance with a first embodiment of the present invention;

FIG. 2 illustrates a cross section through a moulding material for use in a press moulding method in accordance with a second embodiment of the present invention;

FIG. 3 illustrates a cross section through a moulding material for use in a press moulding method in accordance with a third embodiment of the present invention; and FIG. 4 is a flow diagram which illustrates a press moulding method in accordance with an embodiment of the present invention.

DETAILED DESCRIPTION

Referring to FIG. 1, there is shown a cross section through part of a moulding material 2 for use in a press moulding method in accordance with a first embodiment of the present invention. The moulding material 2 is for press moulding to form a moulded part of fibre-reinforced resin matrix composite material. Preferably, the moulding material 2 is panel shaped, optionally being adapted to form an automotive body panel by press moulding at elevated temperature and pressure.

The moulding material 2 comprises a multilayer laminate 4 including a first fibre layer 6, a curable resin 8 and a syntactic layer 10. The curable resin 8 preferably comprises a thermosetting resin, optionally an epoxy resin. The syntactic layer 10 comprises a polymer matrix 12, which may comprise a resin the same as the curable resin 8, and a plurality of hollow bodies 14 distributed within the polymer matrix 12, typically homogeneously distributed throughout the polymer matrix 12.

In an alternative embodiment the fibre layer 6 comprises a prepreg layer containing the curable resin 8. In another embodiment, the curable resin 8 is present in the syntactic layer 10.

In FIG. 1, and the remaining Figures, the dimensions of the hollow bodies or microspheres are greatly exaggerated for the purpose of clarity of illustration.

Typically, the syntactic layer 10 has a density of from 400 to 1000 kg/m$^3$. The syntactic layer 10 may typically have a volume which is from 30 to 85% of the volume of the curable resin 8 in the moulding material 2.

The hollow bodies 14 are substantially incompressible at the minimum compressive moulding pressure applied to the moulding material of from 0.1 to 2 MPa optionally from 0.1 to 1 MPa. Typically, the hollow bodies 14 comprise substantially rigid microspheres having a crush strength of greater than 10 MPa, optionally being composed of glass. The hollow bodies 14 may have an average (d=0.5) diameter of from 5 to 120 microns, and may be spherical. The hollow bodies 14 may have a shape other than spherical.

The syntactic material employs non-compressible, e.g. glass, microspheres with a crush strength in excess of the moulding pressure, for example a crush strength >30 bar. This structure provides a strong but light core. The low density syntactic material enables a significant reduction of the panel weight. The rigid incompressible microspheres add strength, rigidity and lightness to the cured product. They may be only slightly compressible during moulding due to the elastic reduction of the microsphere under load. At a critical pressure however the microsphere buckles and fails due to the low strain of the glass. It is possible to then select different grades to have a compressible material but the crush strength is generally well in excess of the desired moulding pressure.

As illustrated in FIG. 2, the multilayer laminate may further include a second fibre layer 22, associated with a second resin layer 9 and the syntactic layer 10 is a core layer between the first and second fibre layers 6, 22.

In an alternative embodiment the fibre layers 6, 22 each comprise a prepreg layer containing the curable resin 8, 9. In another embodiment, the curable resin 8, 9 is present in the syntactic layer 10.

Therefore in the embodiments of FIGS. 1 and 2, the or each fibre layer 6, 22 may comprise a layer of dry fibres, with the curable resin being wholly or partly in the syntactic layer 10, or alternatively may comprise a prepreg layer, the prepreg including the curable resin. These modified embodiments avoid the provision of an independent resin layer.

In the embodiments of FIGS. 1 and 2, at least some of the fibres may comprise carbon fibres and a layer of carbon fibres is adjacent to a layer of resin. Alternatively, glass fibres may be present in either or both fibre layer 6, 22.

FIG. 3 illustrates a moulding material for use in a press moulding method comprising a multilayer laminate 24 in accordance with a third embodiment of the present invention. The multilayer laminate 24 is an engineered structure which is configured to achieve low weight and to avoid thermal warping as cools down from the moulding temperature.

Primarily, the multilayer laminate 24 comprises a central core layer 26 between two fibre layers 28, 30. In the illustrated embodiment, the central core layer 26 comprises a syntactic lightweight core. The core layer 26 includes a polymer matrix layer 32, typically composed of the same curable resin as used to impregnate the fibre layer, and hollow particles 34 distributed therein. Typically, the particles 34 are homogeneously distributed throughout the polymer matrix layer 32.

In some areas of the multilayer laminate 24, the core layer 26 may be omitted. For example, when the moulding material is to form an automotive body panel, the syntactic core layer 26 is omitted in low thickness regions, such as edges of the body panel or fine details where the moulding material comprises surface film and fibre laminate only. In addition, in some areas of the multilayer laminate 24 optional additional reinforcements may be provided for localised strength.

In this embodiment one fibre layer 28 is intended to be located toward the exposed surface of the part to be moulded from the moulding material, for example the surface of an automotive body panel. This fibre layer 28 is a structural layer to provide stiffness to the moulded part, such as a panel. Typically, fibre layer 28 comprises a carbon or glass fibres, typically woven into a fabric.

The fibre layer 28 is selected to provide the desired mechanical properties to the resultant moulded part. For example, when the moulded part is intended to be an automotive body panel, the fibre layer 28 has a low coefficient of thermal expansion and high tensile modulus.

A first resin layer 37 is disposed between the fibre layer 28 and the core layer 26. The first resin layer 37 is typically a curable thermosetting resin, such as an epoxy resin. The first resin layer 37 is preferably selected to have a composition to provide, when cured, a high glass transition temperature Tg, for example a Tg of at least 200° C. This high temperature is selected so that the cured moulded part can be subjected to elevated temperatures, for example by passing a press moulded automotive body panel down a high temperature automotive body paint line, without degradation or warping of the panel.

A thermosetting resin, such as an epoxy resin, which is thermally stable at 200° C. has a high cross link density, and correspondingly tends to exhibit a highly exothermic cure. Accordingly, the structure of the panel is adapted to resist degradation or warping of the part during the exothermic cure.

The fibre layer 28 typically comprises a woven carbon fibre layer 28 on top of the resin layer 37 which is an epoxy resin to provide, when cured, a high glass transition temperature Tg of at least 200° C.

A surface layer 38 comprises a resin layer 40 located at the surface of the multilayer laminate 24 and a lightweight woven glass fibre layer 42. The resin layer 40 typically comprises a thermosetting resin, such as an epoxy resin, which is thermally stable at 200° C. The surface layer 38 functions to permit the resultant cured and moulded surface to accept a later-applied paint primer and, particularly by the provision of the woven layer 42, to buffer against deformation (known in the art as "print-through") of the moulded surface by the uppermost fibre layers. Such print-through may be generated by uppermost layers of high modulus and/or high fibre thickness, and is particularly prevalent when carbon fibres are employed at the surface of the moulded part. The thermosetting resin may include a filler such as talc. The talc filler provides the cured surface layer with an abradability so that the surface can be easily abraded, in order to provide a desired finish to the surface or to repair the surface. The talc filler also reduces the coefficient of thermal expansion of the surface layer 38 and increases the tensile modulus of the surface layer 38.

The surface layer 38 may optionally further comprise at its outermost surface a fine weave veil 43 to assist air removal at the mould surface during the moulding process.

Such a fibre/resin structure provides panel stiffness and assists, together with the remaining layers as discussed below, in achieving a balance of the thermal expansion of the various layers on opposite sides of the core layer 26, so that the entire multilayer structure tends not to warp during manufacture or use. The carbon fibre exhibit a low coefficient of thermal expansion and a high tensile modulus, such as Young's modulus. However, for the combination of the surface layer 38, fibre layer 28 and the resin layer 36 the combined thermal expansion may be relatively high due to the thickness of the surface resin layer.

The second fibre layer 30 in this embodiment is intended to be located remote from the exposed surface of the part to be moulded from the moulding material. This is a further structural layer to provide stiffness to the moulded part, such as a panel. Typically, the fibre layer 30 comprises carbon or glass fibres, woven into a fabric.

A second resin layer 44 is disposed adjacent to the second fibre layer 30 and to the core layer 26. The second resin layer 44 is also preferably selected to have a composition to provide, when cured, a high glass transition temperature Tg, for example a Tg of at least 200° C.

An additional rearward fibrous reinforcement layer 45 and resin layer 46 may be provided.

In the preferred embodiment, when the moulding material 24 is intended to be press moulded to form an automotive body panel, the outer fibre layer 28 comprises carbon fibres, woven into a fabric and the inner fibre layer 30 comprises glass fibres, woven into a fabric. The fibre layers 28, 30, together with the resins of the first and second resin layers 37, 44, and the surface layer, 38, provide good thermal balance to the entire laminate 24 during the press moulding process.

During cure, the relative layer positions need to be maintained to retain the mechanical properties of the engineered structure and avoid warping. The outer carbon fibre layer 28 has a lower coefficient of thermal expansion than the inner glass fibre layer 30, but the combination of the different layer structures on opposite sides of the core layer 26 tends to balance the thermal expansion coefficient on either side of the syntactic core layer 26 leading to reduced distortion when moulding the moulding material 24 at elevated temperature and pressure. The layer properties, in particular the coefficient of thermal expansion, are selected to provide a neutral axis within syntactic core layer 26 which avoids thermal distortion during press moulding at elevated temperature.

FIG. 4 illustrates a method in accordance with the present invention of press moulding the moulding material of the embodiments of any of FIGS. 1 to 3 to form a moulded part of fibre-reinforced resin matrix composite material.

The method may be used with other moulding materials apart from those of FIGS. 1 to 3 provided that the moulding material contains fibres, resin and a syntactic layer comprising a polymer matrix and a plurality of hollow bodies distributed within the polymer matrix.

Preferably, the moulding material comprises a multilayer laminate and the syntactic layer is a core layer between first and second fibre layers. The fibres may include a layer of dry fibres adjacent to the syntactic layer. Optionally, the fibres include a pair of layers of dry fibres adjacent to and on opposite sides of the syntactic layer which forms a core layer between the dry fibre layers. The resin may include at least one layer of resin adjacent to a respective dry fibre layer. In alternative embodiments, the fibres include at least one prepreg layer containing the curable resin. In any embodiment, the resin may comprise a thermosetting resin, optionally an epoxy resin.

In some preferred embodiments, at least some of the fibres comprise carbon fibres and a layer of carbon fibres is adjacent to a respective layer of resin. In a particularly preferred embodiment, the moulding material comprises a multilayer laminate and the syntactic layer is a core layer between a first carbon fibre layer and a second glass fibre layer, each fibre layer being adjacent to a layer of resin. In any embodiment the moulding material further comprises a layer of a surfacing resin on the front face of the moulding material which is on the same side of the syntactic layer as the first carbon fibre layer. In any embodiment the moulding material and the moulded part may be panel shaped, optionally the moulded part being an automotive body panel.

Referring to FIG. 4, in the illustrated embodiment of the method of press moulding a moulding material to form a moulded part of fibre-reinforced resin matrix composite material, in a loading step 50 the moulding material is located in a mould tool. The moulding material is laid up into the mould tool. As described above, the moulding material contains fibres, resin and a syntactic layer comprising a polymer matrix and a plurality of hollow bodies distributed within the polymer matrix, and may one of a variety of different structures as discussed above.

The mould tool typically comprises part of an apparatus for press moulding materials to form a moulded part of fibre-reinforced resin matrix composite material. The apparatus further comprises a press, typically hydraulically actuated, which urges together the upper and lower mould parts which, when the mould is closed, defines a mould cavity of predetermined volume, shape and dimensions.

The lower part typically includes an upward-facing moulding surface which is configured to mould the front face of the moulded part, for example the front surface of an automotive body panel. Accordingly, the moulding material is oriented within the mould tool so that the desired front surface of the moulding material is oriented downwardly towards the upward-facing moulding surface of the lower part.

Thereafter in an optional partial closing step 52 the lower and upper parts are relatively moved, for example by lowering the upper part downwardly towards the lower part, so as partially to close the mould tool. During the partial closing the upper and lower parts are brought into engagement with the moulding material Then, in a draping step 54, the moulding material is permitted to drape at least partly under the action of gravity within the mould so as to configure at least part of the draped moulding material in a partly moulded shape. In the partially closed configuration the upper part applies an additional downward force to the moulding material to enhance draping of the moulding material.

In the draping step, the moulding material typically drapes by bending about a neutral axis substantially centrally located with respect to the thickness of the moulding material, the neutral axis being located within the syntactic layer. A lower surface of the moulding material is draped onto at least a part of a lower moulding surface of the mould tool. This pre-shaping of the moulding material by draping achieves preliminary pre-shaping without moulding stresses being introduced into the moulding material. Preferably the draping step is carried out at elevated temperature, so that during the draping step the moulding material is heated to cause the viscosity of the resin initially to decrease as a result of an increase in resin temperature and then to increase as a result of initiation of curing prior to fully closing the mould. Optionally in the draping step, a reduced pressure is applied to the partly closed mould cavity to increase the drape of the moulding material.

Thereafter, in a mould closing step 56 the mould is fully closed to define a closed mould cavity containing the moulding material.

Then, in a pressing step 58, pressure, and preferably an elevated temperature, is applied to the mould cavity to cause the resin to flow and impregnate the fibres. The pressing step configures the moulding material into a fully moulded shape.

During the moulding operation, the mould tool is closed to define the mould cavity. The temperature and pressure are increased to consolidate the moulding material and cause the resin to flow throughout the entire mould cavity and fully impregnate the fibrous material of the moulding material. The moulding material charge has been selected so as to have a greater volume than the volume of the mould cavity. Therefore during the moulding process the hydraulic pressure of the resin increases during the consolidation and impregnation steps to ensure resin flow throughout the entire mould cavity, and ensure full and consistent resin impregnation.

As described above, the mould tool comprises a lower part and an upper part. Preferably at least the upper part is heated to an elevated temperature, and from the loading step until at least the commencement of the mould closing step the lower part is at a lower temperature than the upper part. The temperature of the lower part is controlled so as to delay the onset of gelation of the resin until after the mould has been closed. After the mould has been closed, heat flows downwardly from the upper part into the resin, to assist curing of the resin, and towards the lower part. Typically, the resin cures exothermically, for example when the resin is an epoxy resin, heat from the resin is sunk into the lower part which increases in temperature after closure of the mould.

Finally, during a curing step 60 in the closed mould configuration the resin is substantially fully cured to form a moulded part from the moulding material.

The compressive moulding pressure applied to the moulding material is at least 0.1 MPa, optionally at least 1 MPa, typically up to 2 MPa. Typically the syntactic layer has a final density of from 400 to 1000 kg/m$^3$, equating to approximately 33% to 83% volume fraction of the cured polymer resin.

The present invention has particular application in the press moulding of multilayer moulding material structures incorporating partially impregnated or unimpregnated prepregs and/or resin layers.

After the press moulding operation has terminated and the resin has fully cured, the mould tool is opened, and the moulded part is demoulded from the mould tool.

The preferred embodiments of the present invention can provide the press moulding of a compressible multilayer moulding material which can deliver consistent press moulded composite parts. This moulding material can enable net shape parts to be manufactured, thereby requiring less finishing work and permitting the use of simpler press and tooling designs.

Various modifications to the illustrated embodiments of the invention will be readily apparent to those skilled in the art.

The invention claimed is:

1. A method of press moulding a multilayer moulding material structure to form a moulded part of fibre-reinforced resin matrix composite material, the method comprising the steps of:
   i. providing a multilayer moulding material structure, the multilayer moulding material structure containing fibres, resin and a syntactic layer comprising a polymer matrix and a plurality of hollow bodies distributed within the polymer matrix, wherein the multilayer moulding material structure comprises a multilayer laminate and the syntactic layer is a core layer between first and second fibre layers, and then in a loading step locating the multilayer moulding material structure into a mould tool which comprises a lower part and an upper part, wherein at least the upper part is heated to an elevated temperature;
   ii. draping a lower surface of the multilayer moulding material structure onto at least a part of a lower moulding surface of the mould tool thereby permitting the multilayer moulding material structure to drape at least partly under the action of gravity within the mould tool so as to configure at least part of the draped multilayer moulding material structure in a partly moulded shape, wherein the multilayer moulding material structure drapes by bending about a neutral axis substantially centrally located with respect to the thickness of the multilayer moulding material structure, the neutral axis being located within the syntactic layer;
   iii. fully closing the mould tool to define a closed mould cavity containing the multilayer moulding material structure;
   iv. applying pressure to the mould cavity to cause resin to flow and impregnate the fibres and to configure the multilayer moulding material structure in a fully moulded shape; and
   v. substantially fully curing the resin to form a moulded part from the multilayer moulding material structure, wherein steps ii and iv are carried out at elevated temperature, from step i until at least the commencement of step iii the lower part is at a lower temperature than the upper part, and in step ii the multilayer moulding material structure is heated to cause the viscosity of the resin initially to decrease as a result of an increase in resin temperature and then to increase as a result of initiation of curing prior to step iii, and the temperature of the lower part is controlled so as to delay the onset of gelation of the resin until after step iii.

2. A method according to claim 1 wherein the fibres include a layer of dry fibres adjacent to the syntactic layer.

3. A method according to claim 2 wherein the fibres include a pair of layers of dry fibres adjacent to and on opposite sides of the syntactic layer which forms a core layer between the dry fibre layers.

4. A method according to claim 2 wherein the resin includes at least one layer of resin adjacent to a respective dry fibre layer.

5. A method according to claim 1 wherein the fibres include at least one prepreg layer containing the curable resin.

6. A method according to claim 1 wherein the resin comprises a thermosetting resin, optionally an epoxy resin.

7. A method according to claim 1 further comprising the step, between steps i and iii, of partially closing the mould tool by bringing the upper and lower parts into engagement with the moulding material.

8. A method according to claim 7 wherein in the partially closed configuration the upper part applies an additional downward force to the multilayer moulding material structure to enhance draping of the moulding material.

9. A method according to claim 1 wherein after closing step iii heat flows downwardly from the upper part into the resin, to assist curing of the resin, and towards the lower part.

10. A method according to claim 9 wherein the resin cures exothermically.

11. A method according to claim 10 wherein heat from the resin is sunk into the lower part which increases in temperature after closing step iii.

12. A method according to claim 1 wherein in step ii a reduced pressure is applied to the mould cavity to increase the drape of the multilayer moulding material structure.

13. A method according to claim 1 wherein the syntactic layer comprises hollow bodies which are substantially incompressible at a compressive moulding pressure applied to the multilayer moulding material structure of from 0.1 to 2 MPa.

14. A method according to claim 13 wherein the hollow bodies comprise substantially rigid microspheres having a crush strength of greater than 10 MPa, optionally composed of glass.

15. A method according to claim 13 wherein the hollow bodies have an average (d=0.5) diameter of from 5 to 120 microns, the width corresponding to a diameter when the hollow bodies are spherical.

16. A method according to claim 1 wherein the syntactic layer has a density of from 400 to 1000 kg/m$^3$.

17. A method according to claim 1 wherein the syntactic layer has a volume which is from 30 to 85% of the volume of the resin in the multilayer moulding material structure.

18. A method according to claim 1 wherein at least some of the fibres comprise carbon fibres and a layer of carbon fibres is adjacent to a respective layer of resin.

19. A method according to claim 18 wherein the multilayer moulding material structure comprises a multilayer laminate and the syntactic layer is a core layer between a first carbon fibre layer and a second glass fibre layer, each fibre layer being adjacent to a layer of resin.

20. A method according to claim 19 wherein the multilayer moulding material structure further comprises a layer of a surfacing resin on the front face of the multilayer moulding material structure which is on the same side of the syntactic layer as the first carbon fibre layer.

21. A method according to claim 1 wherein the tensile strength of the cured resin is at least 40 MPa, optionally from 50 to 100 MPa, further optionally from 70 to 100 MPa.

22. A method according to claim 1 wherein the Young's modulus of the cured resin is from greater than 2 GPa to 4 GPa, optionally from 3 to 4 GPa.

23. A method according to claim 1 wherein the multilayer moulding material structure and the moulded part are panel shaped, optionally the moulded part being an automotive body panel.

* * * * *